United States Patent [19]

Hooser

[11] Patent Number: 4,733,634
[45] Date of Patent: Mar. 29, 1988

[54] AUTOMATIC HOME PET FEEDER

[76] Inventor: Herbert M. Hooser, Nakamura-so, 1-10 Wakaba-cho, Shinjuku-ku, Tokyo 160, Japan

[21] Appl. No.: 3,365

[22] Filed: Jan. 14, 1987

[51] Int. Cl.4 .............................................. A01K 5/02
[52] U.S. Cl. .................................. 119/51.12; 119/51.5; 119/55
[58] Field of Search ............... 119/51.13, 51.12, 51.11, 119/51.5, 55, 76

[56] References Cited

U.S. PATENT DOCUMENTS 3,416,497 12/1968 Riel .................................... 119/51.11
3,985,104 10/1976 Klemer ............................. 119/51.12
4,069,793 1/1978 Gower ............................. 119/51.13

FOREIGN PATENT DOCUMENTS 2565066 12/1985 France ............................. 119/51.11

Primary Examiner—Robert P. Swiatek
Assistant Examiner—Mary E. McNeil
Attorney, Agent, or Firm—Richard L. Miller

[57] ABSTRACT

An automatic home pet feeder is provided which when set to go off at a pre-determined time will automatically release food and water into trays for a pet to eat and drink. An automatic computerized time setting device with a voice recording of the pet owner will sound at the pre-determined time to notify the pet that it's feeding time.

8 Claims, 10 Drawing Figures

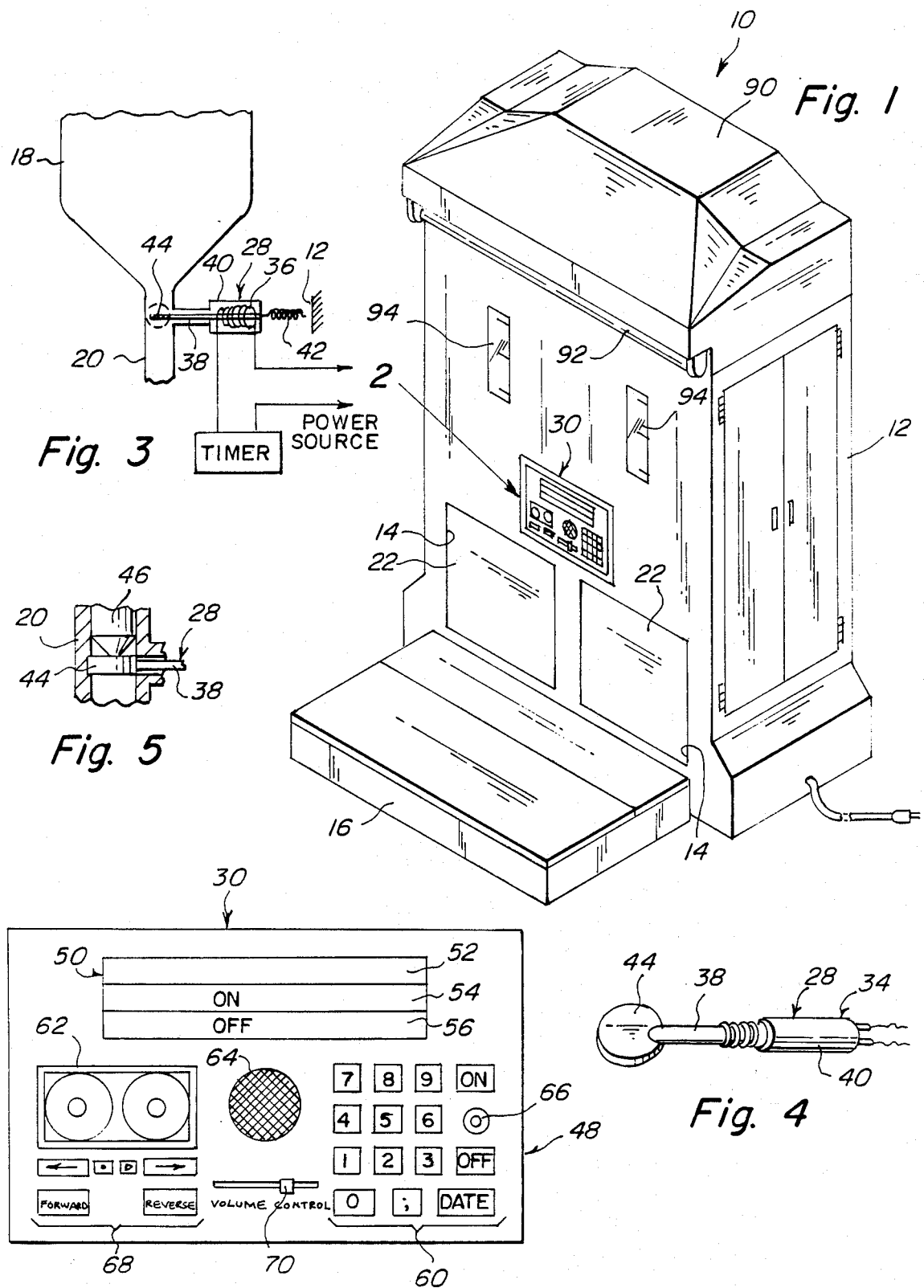

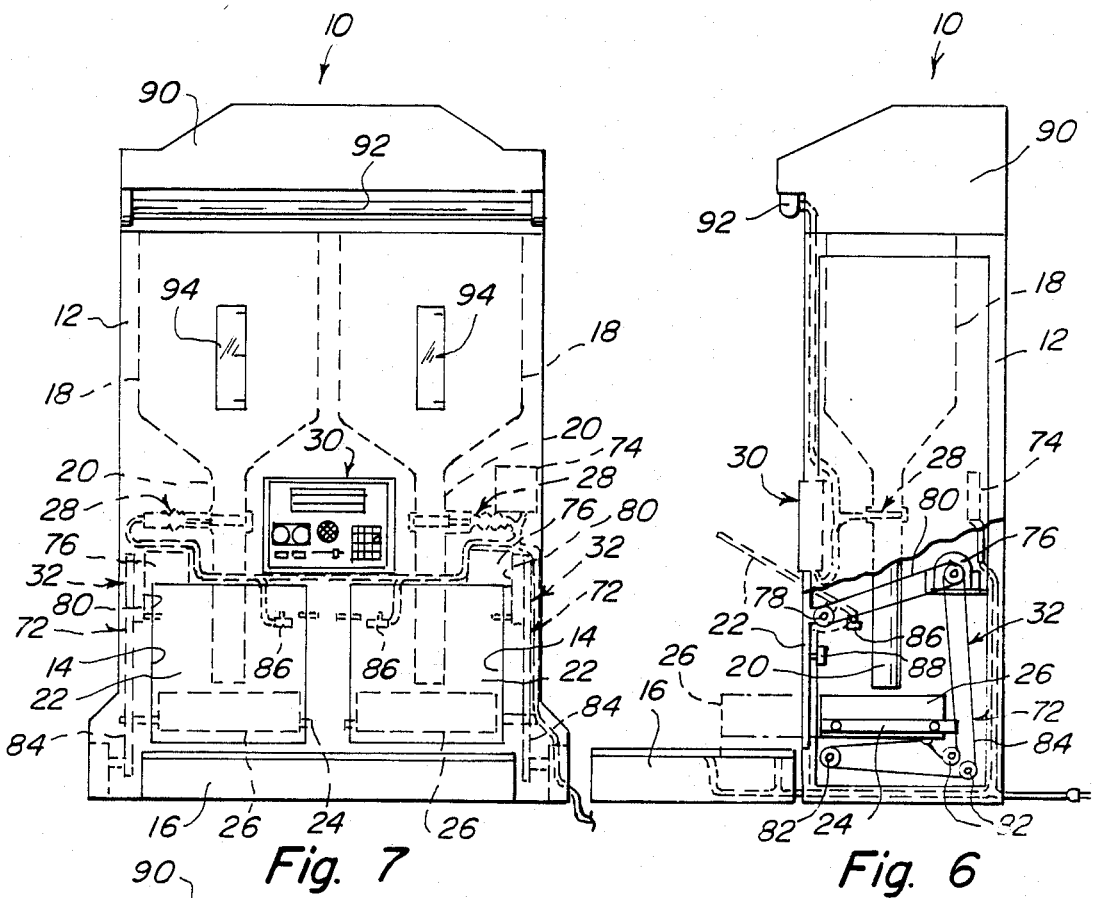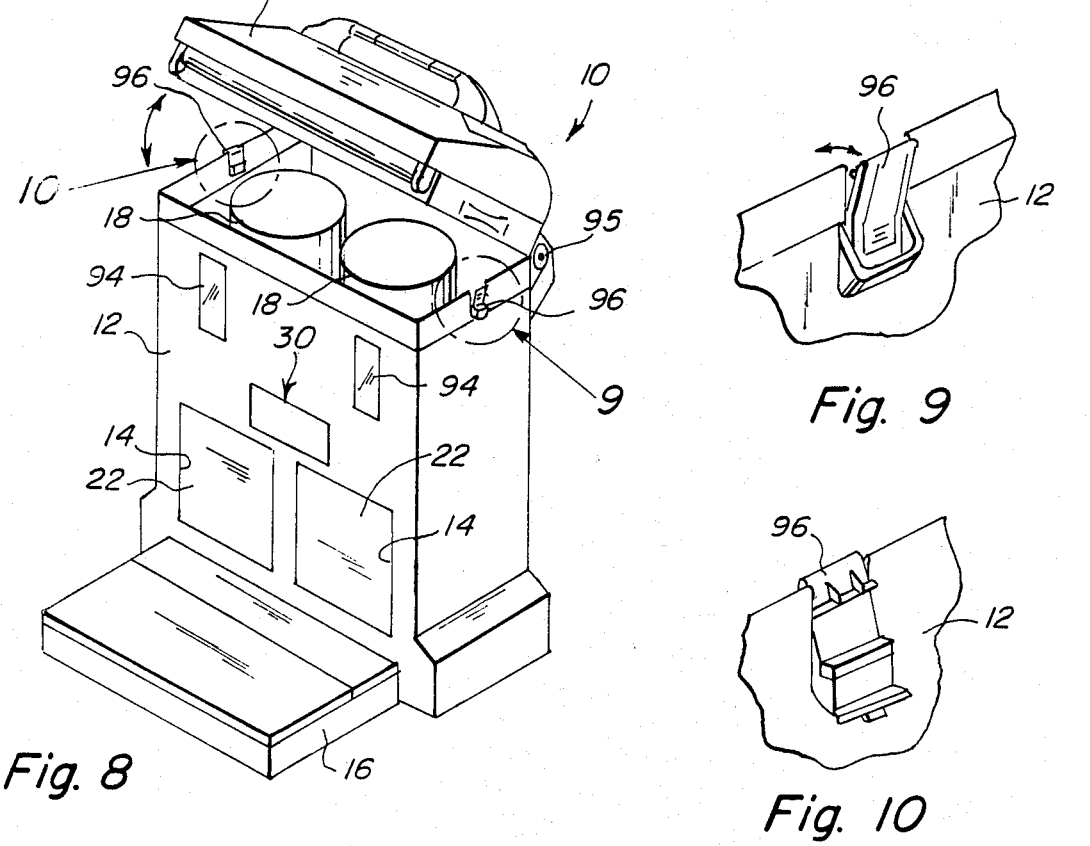

AUTOMATIC HOME PET FEEDER

BACKGROUND OF THE INVENTION

The instant invention relates generally to animal feeding devices and more specifically it relates to an automatic home pet feeder.

Numerous animal feeding devices have been provided in the prior art that are adapted to supply constant quantities of food and water to animals. For example, U.S. Pat. Nos. 3,340,851; 3,385,104 and 4,069,793 all are illustrative of such prior art. While these units may be suitable for the particular purpose to which they address, they would not be as suitable for the purpose of the present invention as hereafter described.

SUMMARY OF THE INVENTION

A primary object of the present invention is to provide an automatic home pet feeder that will overcome the shortcomings of the prior art devices.

Another object is to provide an automatic home pet feeder which when set to go off at a certain time of day or night will automatically release food into a tray for a pet to eat and also water for the pet to drink.

An additional object is to provide an automatic home pet feeder that includes an automatic computerized time setting device with a voice recording of the pet owner which sounds at a pre-determined time to notify the pet that it's feeding time.

A further object is to provide an automatic pet feeder that is simple and easy to use.

A still further object is to provide an automatic pet feeder that is relatively economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention.

FIG. 2 is an enlarged front view of the digital programming keyboard as indicated by numeral 2 in FIG. 1.

FIG. 3 is a diagrammatic front view illustrating the sliding gate mechanism.

FIG. 4 is a perspective view of the sliding gate and actuator.

FIG. 5 is an enlarged cross sectional view showing the mechanism for the water gate.

FIG. 6 is a side view of the invention with parts broken away showing the internal mechanism therein.

FIG. 7 is a similar front view.

FIG. 8 is a perspective view showing a hinge cover with locking latches.

FIG. 9 is an enlarged front perspective view of one of the locking latches as indicated by numeral 9 in FIG. 8.

FIG. 10 is an enlarged rear perspective view of the locking latch as indicated by numeral 10 in FIG. 8.

DETAILED DESCRIPTION OF THE PREFERRED EMBODIMENTS

Turning now descriptively to the drawings, in which like reference characters denote like elements throughout the several views, FIGS. 1, 6 & 7 illustrate an automatic home pet feeder 10 consisting of a cabinet 12 having a pair of front apertures 14 therethrough. A feeding station 16 is disposed at lower front portion of the cabinet 12 below the front apertures 14. A pair of hoppers 18 are disposed in upper portion of the cabinet 12. One of the hoppers stores food while the other of the hoppers stores water. A pair of vertical outlet tubes 20 are provided each of which extends from the bottom of each of the hoppers 18. A pair of pivotable doors 22 are also provided, eah being disposed in one of the front apertures of the cabinet 12. A pair of guide assemblies 24 are mounted within the cabinet, in which each of the guide assemblies is aligned with one of the front apertures 14. A pair of trays 26 are provided. Each of the trays is slideably contained in each of the guide assemblies 24 to be normally disposed under one of the outlet tubes 20. One of the trays 26 is capable of receiving food from one of the hoppers 18 while other of the trays 26 is capable of receiving water from other of the hoppers 18.

A pair of electrically-operated solenoid valves 28 are provided. Each of the solenoid valves is disposed in each of the outlet tubes 20, responsive to a periodic electrical signal for sequentially opening and closing each of the outlet tubes 20 for a predetermined timed interval to allow food and water from the respective hoppers 18 to drop into the respective trays 26. An automatic timer unit 30 in the cabinet 12 supplies the periodic sequential electrical signal to the solenoid valves 28.

A mechanism 32 is for simultaneously opening the doors 22 and forwardly moving the trays 26 after food and water drop into the respective trays 26. The mechanism 32 is the responsive to an electrical signal received when a pet (not shown) steps upon the feeding station 16.

As best shown in FIGS. 3 and 4 each of the solenoid valves 28 contains an actuator 34 that includes an electric coil 36 and a shaft 38 within a casing 40. A coil spring 42 is between the shaft 38 and wall of the cabinet 12. A sliding gate 44 is affixed to free end of the shaft 38 to be disposed in one of the outlet tubes 20 so that when the actuator 34 is actuated the gate 44 will slide transversely to the outlet tube 20 to open a passage therethrough.

FIG. 5 the sliding gate 44 shown is for the water hopper 18 and includes a wringing device 46 like a rote to drain water little by little to control quantity of water through the outlet tube 20.

As best seen in FIG. 2 the automatic time unit 30 is a weekly memory time control digital keyboard system 48 consisting of a digital time indicator 50 for best time 52, set time on 54 and set time off 56. A keyboard 58 has digital buttons 60 bearing numbers "0" to "9", a semi colon mark, ON, OFF and DATE so that the best time 52, set time on 54 and set time off 56 on the digital time indicator 50 can be programed. A cassette recorder 62 has a computer chip to memorize time program and a cassette tape deck with a recorded tape of voice of owner of pet to remind the pet when it is time to eat through a speaker box outlet 64. A warning lamp 66 flashes red when the hoppers 18 are out of food and water. Manual switch buttons 68 operate the cassette recorder 62 manually. The automatic time unit 30 also contains a volume control knob 70.

The mechanism 32 includes two assemblies 72 each of which contains a control unit 74 electrically connected to the automatic time unit 30. An electronic motor 76 is electrically connected to the control unit 74. A pulley 78 is connected to one of the pivotable doors 22. A first endless belt 80 is disposed between the motor 76 and the pulley 78 so that the motor can open and close the door 22. A set of pulleys 82 is rotatively connected within the cabinet 12.

A second endless belt 84 is disposed between the motor 76 and the pulleys 82 in the L-shaped configuration in which one of the trays 26 is hooked onto the second endless belt so that the motor 76 can move the tray 26 forward. A pair of switches 86 and 88 are disposed within the cabinet 12 and are electrically connected to the control unit 74 one switch 86 turns off when the door 22 fully opens allowing the motor 76 to reverse. The other switch 88 turns on when the door fully closes allowing the motor 76 to stop.

A removable cover 90 is disposed over the cabinet 12 so that the hoppers 18 can be filled with food and water. A florescent lamp 92 is electrically mounted to front of the cover 90 so as to illuminate the feeding station 16. A pair of transparent windows 94 each extends through front of the cabinet 12 and each of the hoppers 18 so that level of food and water can be indicated and viewed therefrom.

As shown in FIGS. 8 a hinge 95 is disposed on one side of the cover 90 and top of the cabinet 12 so that the cover can pivot open thereon. A pair of locking latches 96 locks the cover 90 to the cabinet 12 when the cover is closed thereon. The locking latch 96 keeps the cover locked closed on top of the cabinet 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic home pet feeder comprising:
   (a) a cabinet having a pair of front apertures therethrough;
   (b) a feeding station disposed at a lower portion of said cabinet below said front apertures;
   (c) a pair of hoppers disposed in an upper portion of said cabinet, one of said hoppers is for storing food while other of said hoppers is for storing water;
   (d) a pair of vertical outlet tubes, each of which extends from the bottom of each of said hoppers;
   (e) a pair of pivotable doors, each being disposed in one of said front apertures of said cabinet;
   (f) a pair of guide assemblies mounted within said cabinet, each of said guide assemblies aligned with one of said front apertures;
   (g) a pair of trays, each of said trays slideably contained in each of said guide assembles to be normally disposed under one of said outlet tubes, one of said trays capable of receiving food from one of said hoppers while other of said trays capable of receiving water from other of said hoppers;
   (h) a pair of electrically-operated solenoid valves, each of said solenoid valves disposed in each of said outlet tubes responsive to a periodic electrical signal for sequentially opening and closing each of said outlet tubes for a predetermined time interval to allow food and water from said respective hoppers to drop into said, respective trays;
   (i) an automatic timer unit in said cabinet for controlling said periodic sequential electrical signal to said solenoid valves; and
   (j) means for simultaneously opening said doors and forwardly moving said trays after food and water drop into said respective trays, said means responsive to an electrical signal received caused by a pet stepping upon said feeding station.

2. An automatic home pet feeder as recited in claim 1 wherein each of said solenoid valves comprises:
   (a) an actuator including an electric coil and a shaft within a casing;
   (b) a coil spring between said shaft and wall of said cabinet; and
   (c) a sliding gate affixed to free end of said shaft to be disposed in one of said outlet tubes so that when said actuator is actuated said gate will slide transversely to said outlet tube to open a passage therethrough.

3. An automatic home pet feeder as recited in claim 2 wherein said sliding gate for said water hopper includes a wringing device like a rote to drain water little by little to control quantity of water through said outlet tube.

4. An automatic home pet feeder as recited in claim 3 wherein said automatic timer unit is a weekly memory time control digital keyboard system comprising:
   (a) a digital time indicator for real time, set time ON, and set time OFF;
   (b) a keyboard having digital buttons bearing numbers "0" and "9", a semi color mark, ON, OFF and DATE so that said real set time, set time on, and set time off on said digital time indicator can be programmed;
   (c) a cassette recorder having a computer chip to memorize time program and a cassette tape deck with a recorder tape for the voice of the owner of the pet to remind the pet when it is time to eat;
   (d) a speaker box outlet;
   (e) a warning lamp which flashes red when said hoppers are out of food and water;
   (f) manual switch buttons to operate said cassette recorder manually; and
   (g) a volume control knob.

5. An automatic home pet feeder as recited in claim 4 wherein said opening means includes two assemblies each of which comprises:
   (a) a control unit electrically connected to said automatic time unit;
   (b) an electronic motor electrically connected to said control unit;
   (c) a pulley connected to one of said pivotable doors;
   (d) a first endless belt disposed between said motor and said pulley so that said motor can open and close said door;
   (e) a set of pulleys rotatively connected within said cabinet;
   (f) a second endless belt disposed between said motor and said pulleys in an L-shaped configuration, one of said trays hooked onto said second endless belt so that said motor can move said try forward; and
   (g) a pair of switches disposed within said cabinet and electrically connected to said control unit one of said switches turns off when said door fully opens allowing said motor to reverse, the other of said switches turns off when said door fully closes causing said motor to stop.

6. An automatic home pet feedeer as recited in claim 5 further comprising:
(a) a removable cover disposed over said cabinet so that said hoppers can be filled with food and water;
(b) a florescent lamp electrically mounted on a front of said cover to illuminate said feeding station; and
(c) a pair of transparent windows extending through a front of said cabinet and each of said hoppers so that level of food and water can be indicated and viewed therefrom.

7. An automatic home pet feeder as recited in claim 6 further comprising:
(a) a hinge disposed one on side of said cover and top of said cabinet so that said cover can pivot open thereon; and
(b) means for locking said cover to said cabinet when said cover is closed thereon.

8. An automatic home pet feeder as recited in claim 7 wherein said locking means includes at least one locking latch to keep said cover locked on top of said cabinet.

* * * * *